(12) United States Patent
Tian (10) Patent No.: US 11,827,390 B2
(45) Date of Patent: Nov. 28, 2023

(54) TRANSPORT VEHICLE AND AN UNMANNED AERIAL VEHICLE

(71) Applicant: Autoflight (Kunshan) Co., Ltd., Kunshan (CN)

(72) Inventor: Yu Tian, Hong Kong (CN)

(73) Assignee: AUTOFLIGHT (KUNSHAN) CO., LTD., Jiangsu Province (CN)

( * ) Notice: Subject to any disclaimer, the term of this patent is extended or adjusted under 35 U.S.C. 154(b) by 0 days.

(21) Appl. No.: 18/165,907

(22) Filed: Feb. 7, 2023

(65) Prior Publication Data

US 2023/0249851 A1 Aug. 10, 2023

(30) Foreign Application Priority Data

Feb. 7, 2022 (CN) .......................... 202220260218.0

(51) Int. Cl.
*B64U 80/86* (2023.01)
(52) U.S. Cl.
CPC .................................... *B64U 80/86* (2023.01)
(58) Field of Classification Search
CPC .... B64U 80/86; B60P 1/04; B60P 1/16; B60P 1/486; B60P 1/28; B62D 33/02; B66F 7/085; B66F 7/22
See application file for complete search history.

(56) References Cited

U.S. PATENT DOCUMENTS

| | | | |
|---|---|---|---|
| 11,511,886 B1* | 11/2022 | Tian ......................... | B64F 1/22 |
| 2015/0342111 A1* | 12/2015 | Meenen ............... | A01D 75/002 |
| | | | 414/812 |
| 2020/0239160 A1* | 7/2020 | Cheng .................... | B64F 1/005 |
| 2021/0245648 A1* | 8/2021 | Huang ..................... | B60P 1/16 |
| 2021/0323457 A1* | 10/2021 | Buerkett .................. | B60P 1/28 |

* cited by examiner

*Primary Examiner* — Kaitlin S Joerger
(74) *Attorney, Agent, or Firm* — WPAT LAW, P.C.; Anthony King (57) ABSTRACT

A transport vehicle and an unmanned aerial vehicle (UAV) having a head (1), a control assembly arranged in the head (1) used for controlling the movement state of the transport vehicle. The carrying plate (2) is connected to the head (1) to form an open carriage space so as to accommodate container (3). The container (3) is provided on the carrying plate (2) and at least comprises a base plate (31) and an opening (32). The base plate (31) is provided with an overturning assembly (4), the overturning assembly (4) is rotatably connected to the base plate (31) and is used for driving the piece to be transported to rotate from a first predetermined position around the side direction of the base plate (31) until the piece to be transported is arranged at a second predetermined position through the opening (32).

16 Claims, 5 Drawing Sheets

TRANSPORT VEHICLE AND AN UNMANNED AERIAL VEHICLE

FIELD OF THE DISCLOSURE

The invention relates to the technical field of aviation, in particular to a transport vehicle and an unmanned aerial vehicle.

BACKGROUND OF THE INVENTION

The large size and weight of some models of UAVs make it impossible for personnel to transport them by hand alone. Generally, the UAV needs to be loaded on a transport vehicle, which is used for moving the UAV. Although the UAV movement process is efficient and labor-saving, the UAV needs to be loaded on the transport vehicle before the transportation starts and also needs to be unloaded from the transport vehicle after the transportation is finished. Nowadays, the loading and unloading processes are done manually by the personnel, which not only wastes labor but also makes the loading and unloading inefficient.

Therefore, it is urgent to provide a transport vehicle and UAV to solve the above problems.

SUMMARY OF THE INVENTION

The invention aims to provide a transport vehicle and a UAV, which solves the problem of large UAVs being labor-intensive and inefficient in the process of loading and unloading.

To achieve the above purpose, the following technical solutions are provided:

A transport vehicle, it comprises:
- a head, which is provided with a cockpit inside, the cockpit is provided with a control assembly, the control assembly is used for controlling the movement state of the transport vehicle;
- a carrying plate, connected to the front end;
- a container, is provided on the carrying plate;
- the container comprises at least a base plate and an opening;
- the base plate is provided with an overturning assembly, the overturning assembly is rotatably connected to the base plate, the overturning assembly is used for driving the piece to be transported to rotate from a first predetermined position around the side direction of the base plate until the piece to be transported is arranged at a second predetermined position through the opening.

As an option for the transport vehicle, the overturning assembly (4) comprises:
- a fixing element for fixing the piece to be transported;
- the fixing element is rotatably connected to the base plate;
- a driving element, one end of the driving element is rotatably provided on the base plate, the output end of the driving element is rotatably connected to the fixing element, the output end of the drive element is capable of telescoping to drive the fixing element to rotate around the connection of the fixing element with the base plate.

As an option for the transport vehicle, it further comprises a connecting rod, one end of the connecting rod is connected to the fixing element and the other end is pivotally connected to the base plate.

As an option for the transport vehicle, the connecting rods are provided in a plurality, the plurality of the connecting rods are spaced along the extension direction of the carrying plate.

As an option for the transport vehicle, the connecting rod is provided with a plurality of first weight reduction slots along the extension direction of the connecting rod.

As an option for the transport vehicle, the fixing element comprises:
- a support frame for carrying the piece to be transported;
- the piece to be transported includes a main body, a first part and a second part, the first part is provided along the first direction, the second part connects the main body and the second part;
- the first direction, second direction and third direction two by two are perpendicular to each other; a limiting member, provided on the side of the support frame near the piece to be transported, a limiting slot is arranged on the limiting member, the first part is provided in the limiting slot;
- a fastening band, in the form of a loop, one end of the fastening band can be sleeved with the support frame, the other end of the fastening band can be sleeved with the first part, the fastening band always has a tendency to move the first part and the support frame in close proximity to each other;
- an connection sleeve, provided along the third direction on the side of the support frame near the piece to be transported, the connection sleeve is provided with a holding cavity inside, the second part is capable of passing through the holding cavity along the second direction.

As an option for the transport vehicle, the limiting member is removably connected to the support frame.

As an option for the transport vehicle, the limiting members are provided in a plurality, the plurality of the limiting members are spaced along the first direction.

As an option for the transport vehicle, the fastening band is adjustable in position on the support frame.

An unmanned aerial vehicle, transported by means of the transport vehicle as described in any one of the preceding solutions, the UAV is connected to the overturning assembly, which is used for driving the UAV to rotate until the UAV is set at the first predetermined position or the second predetermined position.

The invention has the beneficial effects comparing with the prior art:

The transport vehicle provided by the invention comprises a head, which is equipped with a cockpit, the cockpit is provided with a control assembly, the control assembly is used for controlling the movement state of the transport vehicle, that is, controlling the start and stop, transport speed and transport path of the transport vehicle. The carrying plate is connected to the head to form an open carriage space so as to accommodate container. The container is provided on the carrying plate and at least comprises a base plate and an opening. The base plate is provided with an overturning assembly, the overturning assembly is rotatably connected to the base plate, and the overturning assembly is used for driving the piece to be transported to rotate from a first predetermined position around the side direction of the base plate until the piece to be transported is arranged at a second predetermined position through the opening. The above transport vehicle achieves the rapid loading and unloading of the piece to be transported on the transport vehicle through the overturning assembly, thus improving the transport efficiency and saving labor costs.

The following call-out list of elements in the drawing can be a useful guide when referencing the elements of the drawing figures:

1. head; 2. carrying plate; 3. container; 4. overturning assembly;
31. base plate; 32. Opening;
41. driving element; 42. fixing element; 43. connecting rod;
411. hydraulic cylinder; 412. piston rod; 4121. second hinge hole;
421. support frame; 4211. first support rod; 4212. second support rod; 4213. reinforcing member; 4214. first pull rod; 4215. second pull rod; 4216. third pull rod; 422. limiting member; 4221. limiting slot; 4222. avoidance slot; 4223. fastening hole; 423. fastening band; 424. connection sleeve; 4241. first connection sleeve; 4242. second connection sleeve;
431. first weight reduction slot; 432. first hinge hole; 433. upper end plate; 434. lower end plate.

DETAILED DESCRIPTION

In order to make the purpose, technical scheme and advantages provided by the embodiments in the invention clearer, the technical scheme in the embodiments of the invention will be described clearly and completely in combination with the drawings in the embodiments of the invention. Obviously, the described embodiments are part of the embodiments of the invention, not all of the embodiments. The components of the embodiments in the invention, which are generally described and shown in the attached drawings herein, can be arranged and designed in various different configurations.

Therefore, the following detailed description of the embodiments of the invention provided in the attached drawings is not intended to limit the scope of the invention to be protected, but only represents the selected embodiments of the invention. Based on the embodiments in the invention, all other embodiments obtained by ordinary technicians in the art without creative work fall within the scope of protection of the invention.

It should be noted that similar labels and letters indicate similar items in the following drawings. Therefore, once an item is defined in a drawing, it is not necessary to further define and explain it in the following drawings.

In the description of the invention, it should be noted that the orientation or position relationship indicated by the terms "up", "down", "left", "right", "vertical", "horizontal", "inside", "outside", etc. is based on the orientation or position relationship shown in the attached drawings, or the orientation or position relationship that is usually placed when the product of the invention is used, it is only for the convenience of describing the invention and simplifying the description. Instead of indicating or implying that the device or element referred to definitely have a specific orientation, be constructed and operated in a specific orientation, so it cannot be understood as a restriction on the invention. In addition, the terms "first", "second" and "third" are only used to distinguish and describe, and cannot be understood as indicating or implying importance level. In the description of the invention, unless otherwise stated, "multiple" means two or more.

In the description of the invention, it should also be noted that unless otherwise specified and limited, the terms "set" and "connection" should be understood in a broad sense, for example, they can be fixed connection, removable connection, or integrated connection; It can be mechanical connection or electrical connection. For those skilled in the art, the specific meaning of the above terms in the invention can be understood in a specific case.

In the invention, unless otherwise specified and defined, the first feature "on" or "under" the second feature may include direct contact between the first and second features, or the first and second features may not be in direct contact, but through an additional feature between them. The first and second features may also be in direct contact with each other, or the first and second features may not be in direct contact with each other, but through another feature between them. Also, the first feature is "above", "over" and "on" the second feature includes the first feature is directly above and diagonally above the second feature, or simply indicates that the first feature is horizontally higher above the second feature. The first feature is "below", "under" and "beneath" the second feature includes the first feature is directly below and diagonally below the second feature, or simply indicates that the horizontal height of the first feature is less than the horizontal height of the second feature.

The embodiments of the invention are described in detail below. The examples of the embodiments are shown in the attached drawings, where the same or similar labels represent the same or similar elements or elements with the same or similar functions from beginning to end. The following embodiments described by referring to the attached drawings are illustrative and are only used to explain the invention, and cannot be understood as restrictions on the invention.

As the loading and unloading of large UAVs nowadays still need to be done manually by personnel, which will not only consume a lot of manpower, but also make the loading and unloading inefficient. In order to solve the above problems, this embodiment proposes a transport vehicle to solve the above problems.

As shown in FIG. 1-FIG. 5, the transport vehicle includes a head 1, a carrying plate 2 and a container 3. The head 1 is provided with a cockpit inside, and the cockpit is provided with a control assembly, which is used for controlling the movement state of the transport vehicle. That is, controlling the start and stop, transport speed and transport path of the transport vehicle. The carrying plate 2 is connected to the head 1 to form an open carriage space so as to accommodate container 3. The container 3 is provided on the carrying plate 2, and the container 3 includes at least a base plate 31 and an opening 32. The base plate 31 is provided with an overturning assembly 4, which is rotatably connected to the base plate 31, and the overturning assembly 4 is used for driving the piece to be transported to rotate from a first predetermined position around the side direction of the base plate 31 until the piece to be transported is arranged at a second predetermined through the opening 32. The above-mentioned transport vehicle achieves the rapid loading and unloading of the piece to be transported on the transport vehicle through the overturning assembly 4, thus improving the transport efficiency and saving labor costs.

Figure 1:
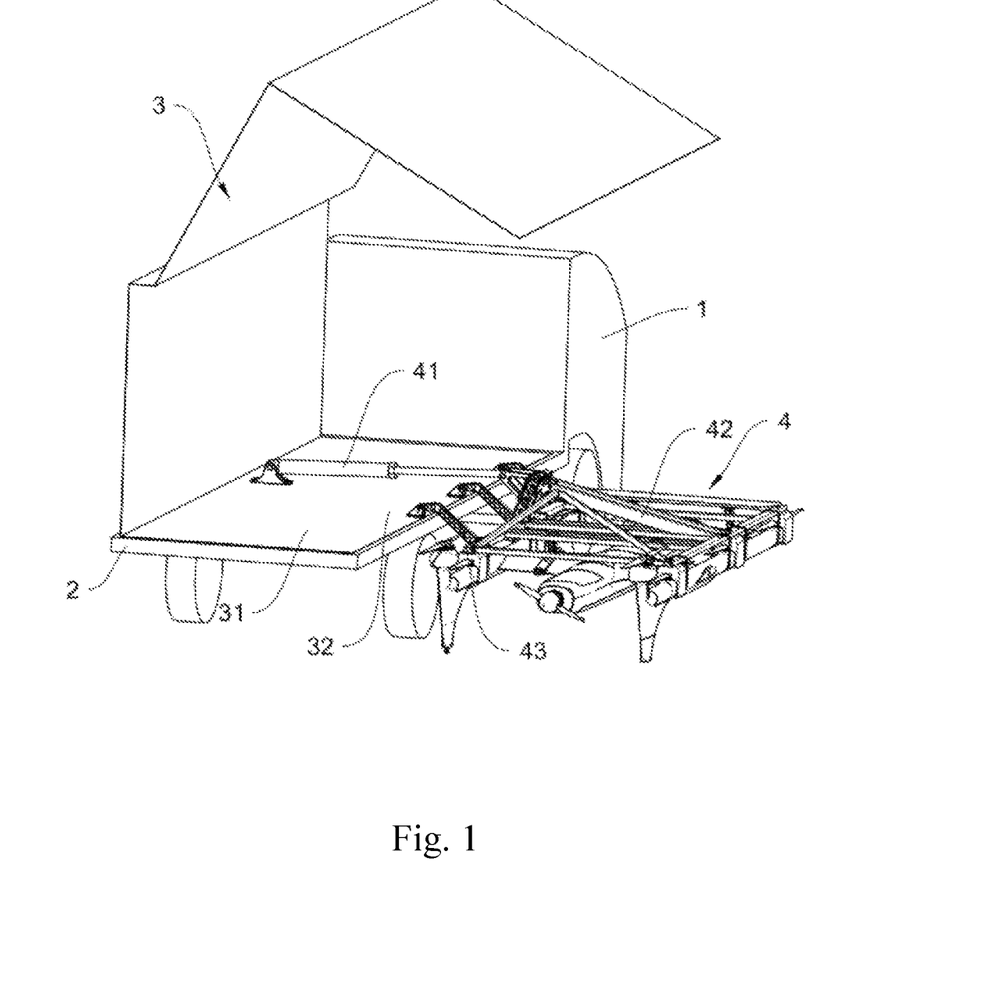
FIG. 1 is a schematic diagram of the assembly of the transport vehicle and the UAV provided by the specific embodiment of the invention.

In this embodiment, the container 3 also includes a first sidewall parallel to the base plate 31 and a second sidewall perpendicular to the base plate 31, the second sidewall is provided with two, the two second sidewalls form a confined space with the first sidewall and the base plate 31 to accommodate the piece to be transported. One of the two second sidewalls is not connected to the base plate 31, the first sidewall is fixedly connected to it. The first sidewall is rotatably connected to the other second sidewall, and the first sidewall is able to rotate relative to the side direction of the other second sidewall to form an opening 32 between the second sidewall and the base plate 31. In other embodiments, the container 3 can also be of open-air design, i.e., including only the base plate 31.

Specifically, in the loading process, the first predetermined position can be regarded as a position set at a second plane outside the transport vehicle near the opening 32 and parallel to the base plate 31, and the second predetermined position can be regarded as a position set at a first plane above the base plate 31. The position of the piece to be transported is the first predetermined position. At first, use the control assembly to drive the transport vehicle to the first predetermined position, then put the piece to be transported connect to the overturning assembly 4, the overturning assembly 4 drives the piece to be transported to rotate counterclockwise around the side direction of the base plate 31 until the piece to be transported is arranged at the second predetermined position through the opening 32, the control assembly controls the transport vehicle to start transporting the piece to be transported. During unloading, the first predetermined position can be considered as a position set at a first plane above the base plate 31, and the second predetermined position can be considered as a position set at a second plane outside the transport vehicle near the opening 32 and parallel to the base plate 31. The position of the piece to be transported is the first predetermined position, and use the control assembly to drive the transport vehicle to the second predetermined position firstly, and then the overturning assembly 4 drives the piece to be transported to rotate clockwise around the side direction of the base plate 31 until the piece to be transported is arranged at the second predetermined position through the opening 32 to complete the transport and proceed to the next step. Moreover, the distance between the second plane and the ground is equal to the height of the piece to be transported on the ground, so that on the one hand the overturning assembly 4 is driven to move by the transport vehicle, thus making the overturing assembly 4 close to the piece to be transported placed on the ground, so that the personnel can achieve the loading of the piece to be transported on the overturning assembly 4 without adjusting the position of the piece to be transported, which reduces the loading difficulty of the piece to be transported; on the other hand, during the unloading process, as long as the piece to be transported meets the ground, the overturning assembly 4 is considered to be flipped in place, avoiding the error caused by artificially determining the flipping angle and improving the accuracy of unloading.

Among them, the overturning assembly 4 includes a fixed element 42 and a driving element 41, the fixed element 42 is used for fixing the piece to be transported, and the fixed element 42 is rotatably connected to the base plate 31. One end of the driving element 41 is rotatably provided on the base plate 31, and the output end of the driving element 41 is rotatably connected to the fixed member 42, and the output end of the drive element 41 can be telescoped to drive the fixing element 42 to rotate around the connection between the fixing element 42 and the base plate 31 to achieve the flip of the piece to be transported relative to the base plate 31.

Further optionally, the carrying plate 2 is provided with an adjusting member, and the output end of the adjusting member is connected to the base plate 31, and the adjusting member is able to change the height of the base plate 31 from the ground, so that the fixing element 42 is located in the second plane after the overturning is finished in the unloading process or before the overturning is started in the loading process, which is facilitate the fixing of the piece to be transported. In this embodiment, the adjusting member is a jack, which is capable of jacking up the container 3 for changing the height of the base plate 31 from the ground. And the jack is set separately from the transport vehicle, using the existing jack can achieve the adjustment of the height of the base plate 31 from the ground, reducing the difficulty of production at the same time, to avoid the waste of production materials. In other embodiments, the adjusting member can be a hydraulic telescoping member or electric jacking member and other structures with telescoping function, and then not too much restriction here.

Figure 2:
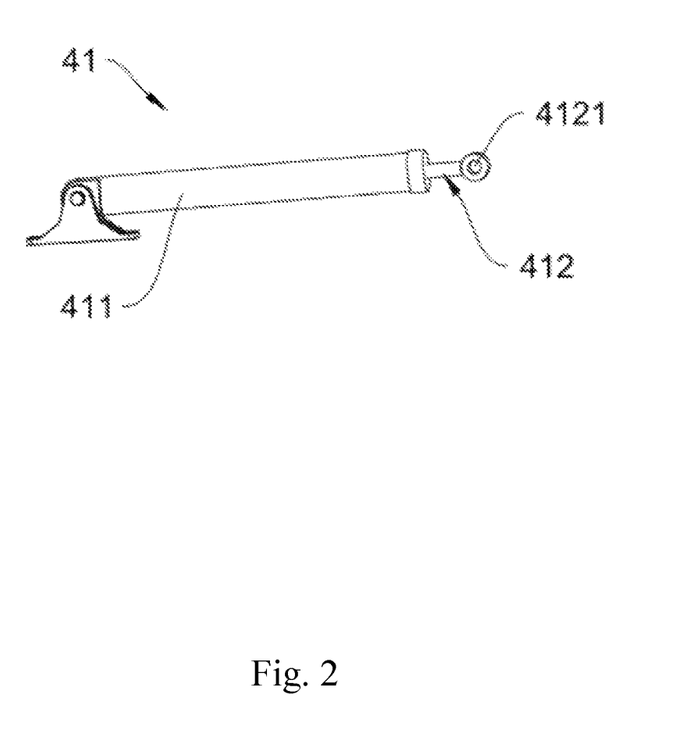
FIG. 2 is a schematic diagram of the structure of the driving element provided by the specific embodiment of the invention.

Further, the driving element 41 can be a hydraulic piston structure or an electric piston structure, as long as it can achieve the expansion and contraction of the driving element 41, without too much restriction. Referring to FIG. 2, in this embodiment, the driving element 41 is a hydraulic piston structure, and the driving member 41 includes a hydraulic cylinder 411 and a piston rod 412, and one end of the piston rod 412 is provided in the hydraulic cylinder 411, and the other end is rotatably connected to the fixing element 42.

Referring again to FIG. 1, optionally, the overturning assembly 4 also includes a connecting rod 43, one end of which is connected to the fixing element 42 and the other end of which is rotatably connected to the base plate 31 to extend the distance between the output end of the driving element 41 on the fixing element 42 and the base plate 31, thereby expanding the flip range of the piece to be transported. In combination with FIG. 4, specifically, the base plate 31 is provided with a first hinged seat, the first hinged seat is provided with a first rotating shaft, and the rotating end of the connecting rod 43 is provided with a first hinge hole 432 along its radial direction, and the first rotating shaft can pass through the first hinge hole 432 to achieve a rotational connection between the connecting rod 43 and the base plate 31.

When the size of the piece to be transported is large, in order to meet the load-bearing requirements of the foundation of the fixing element 42 to be transported, the fixing element 42 should accordingly be selected to a larger size. Due to the large size of the fixing element 42, a single connecting rod 43 is not sufficient to ensure the stability of the fixing element 42 when it is turned over. Therefore, further optionally, the connecting rods 43 are provided with a plurality of connecting rods 43, and the plurality of connecting rods 43 are spaced along the side direction of the base plate 31. In this embodiment, there are three connecting rods 43.

Figure 4:
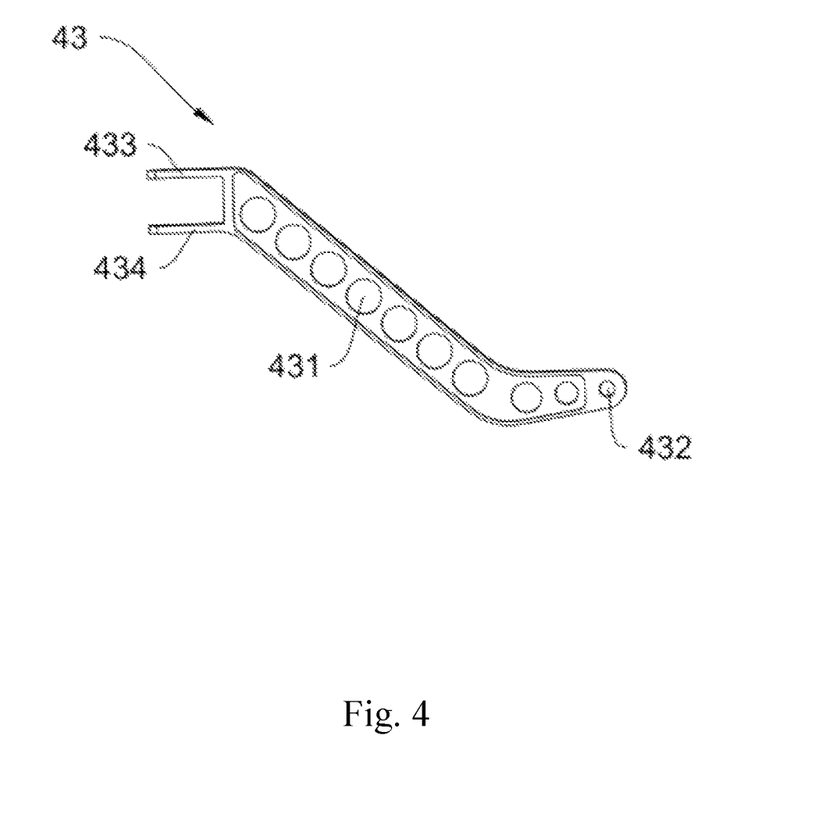
FIG. 4 is a schematic diagram of the structure of the connecting rod provided by the specific embodiment of the invention.

Further optionally, the connecting rod 43 is detachably connected to the fixing element 42, so that the fixing element 42 can be used independently on one hand; on the other hand, the connecting rod 43 can be replaced with different lengths according to the actual working conditions, so as to adjust the flip range of the overturning assembly 4. Specifically, one end of the connecting rod 43 has a C-shaped structure, including an upper end plate 433 and an lower end plate 434, a first positioning hole is opened on the upper end plate 433, a second positioning hole is opened on the lower end plate 434, the axis of the first positioning hole and the axis of the second positioning hole are in the same line, the fixing element 42 is provided between the upper end plate 433 and the lower end plate 434, and a first fastener passes through a first positioning hole, the fixing element 42 and a second positioning hole in turn to realize the connection of the connecting rod 43 on the fixing element 42. Further, the first fastener can be a bolt structure, or can be screws, pins, screws and other parts with fastening effect, without too much limitation here.

Optionally, the connecting rod 43 is provided with a plurality of first weight reduction slots 431 along its extension direction to reduce the weight of the overturning assembly 4, thereby allowing the driving element 41 to flip the piece to be transported even at a lower power.

Figure 3:
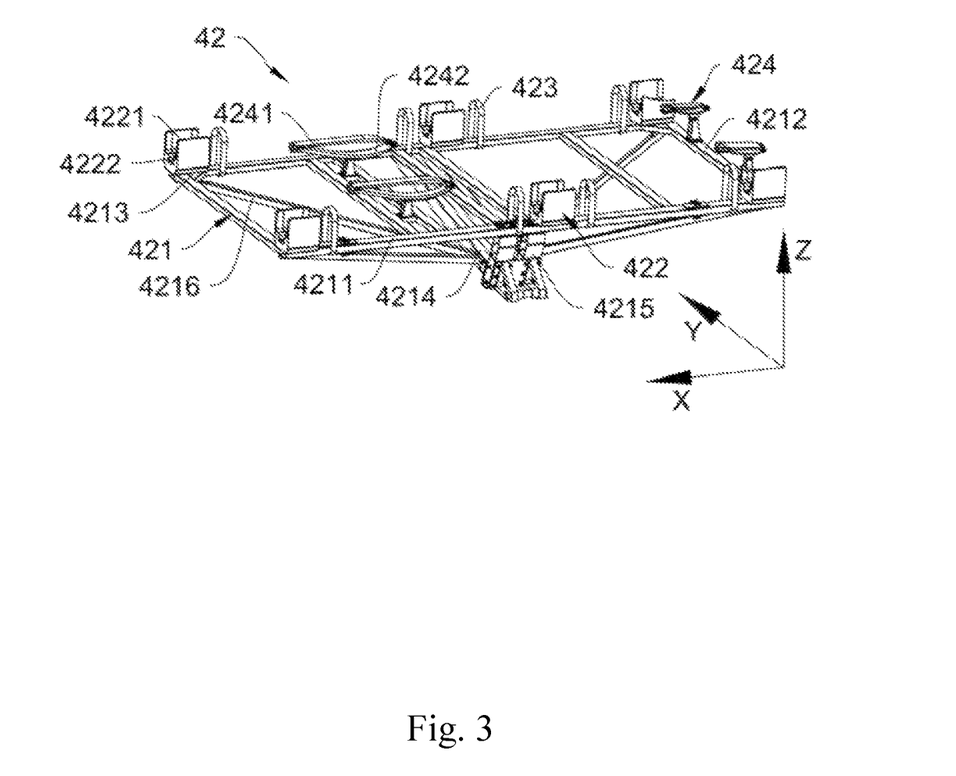
FIG. 3 is a schematic diagram of the structure of the fixing element provided by the specific embodiment of the invention.

As shown in FIG. 3, optionally, the fixing element 42 includes a support frame 421, a limiting member 422, a fastening band 423 and a connection sleeve 424. The support frame 421 is used for carrying the piece to be transported, the piece to be transported includes a main body, a first part and a second part, the first part is provided along the first direction (i.e., the X direction in the attached figure), the second part connects the main body and the second part. Wherein, the first direction is the extension direction of the main body, and the first direction, the second direction (i.e., the Y direction in the attached figure) and the third direction (i.e., the Z direction in the attached figure) two by two are perpendicular to each other.

The limiting member 422 is provided on the side of a support member near the piece to be transported, the limiting member 422 is provided with a limiting slot 4221, the first part of the piece to be transported is provided in the limiting slot 4221 to limit the first part in the second direction by the limiting member 422.

The fastening band 423 is in the form of a loop, and one end of the fastening band 423 can be sleeved with the support frame 421 and the other end of the fastening band 423 can be sleeved with the first part, the fastening band 423 always has a tendency to move the first part and the support frame 421 in close proximity to each other in order to achieve the restriction of the fastening band 423 on the first part in the third direction. When mounting the piece to be transported on the fixing element 42, the fastening band 423 needs to be stretched first so that one end of the fastening band 423 can be sleeved with the support frame 421 and the other end is away from the support frame 421 to leave sufficient space to allow the first part to pass through the fastening band 423, and when the first part passes through the fastening band 423 then loosens the fastening band 423, the fastening band 423 shrinks and carries the first part closer to the support frame 421 to achieve restriction of the first part in the third direction.

The connecting sleeve 424 is provided on the side of the support frame 421 close to the piece to be transported. The connecting sleeve 424 is equipped with a holding cavity inside, and the second part can pass through the holding cavity along the second direction to realize the limit of the connecting sleeve 424 on the second part in the first direction.

The fixing element 42 can limit the first part and the second part of the piece to be transported, which improves the fixing effect of the fixing element 42 to the piece to be transported and prevents the piece to be transported from being damaged due to collision with others during transportation. Specifically, the support frame 421 includes a first support rod 4211 and a second support rod 4212, the first support rod 4211 extends in the first direction and the second support rod 4212 extends in the second direction, two first support rods 4211 spaced apart in the second direction, a plurality of second support rods 4212 are spaced apart from the first end of the first support rod 4211 to the tail end direction of the first support rod 4211 to form the support frame 421. Wherein the first direction is set perpendicular to the second direction in the same plane. The above solution effectively reduces the weight compared to the plate structure of the support frame 421 and facilitates the fixing process. Further, a reinforcing member 4213 is provided between the first support rod 4211 and the second support rod 4212 located at the head and tail ends of the first support rod 4211 to improve the strength of the support frame 421. Further, the support frame 421 also comprises a first pull rod 4214, a second pull rod 4215 and a third pull rod 4216. The first pull rod 4214, the second pull rod 4215 and the third pull rod 4216 are provided on the side of the support frame 421 away from the piece to be transported, one end of the first pull rod 4214 is provided on one of the first support rods 4211 and the other end of the first pull rod is connected to one end of the second pull rod 4215, the other end of the second pull rod 4215 is connected to another first support rod 4211 so that the first pull rod 4214 and the second pull rod 4215 can share the gravity of the piece to be transported itself. Further optionally, one end of the third pull rod 4216 is provided on the first pull rod 4214 and the other end of the third pull rod is provided at the connection of the first support rod 4211 and the second support rod 4212, which further share the gravity of the piece to be transported itself, so that the loadable range of the support frame 421 is expanded. And the more the third pull rod 4216 there are, the more weight the support frame 421 can carry. Further optionally, the second pull rod 4215 is provided with a plurality of second weight reducing slots along its extension direction to reduce the own weight of the fixing element 42. Further optionally, the connections among the first support rod 4211, the second support rod 4212, the reinforcing member 4213, the first pull rod 4214 and the third pull rod 4216 are all welded. In other embodiments, the first support rod 4211, the second support rod 4212, the reinforcing member 4213, the first pull rod 4214 and the third pull rod 4216 can be connected in other ways, as long as the stability of the connection can be ensured, without too much restriction here.

Further optionally, one side of the support frame 421 is connected with the driving element 41. Specifically, a second hinged seat is arranged on the second pull rod 4215, and the second hinged seat includes a second rotating shaft. The output end of the driving element 41 is radially provided with the second hinge hole 4121, and the second rotating shaft can pass through the second hinge hole 4121 to realize the rotational connection between the support frame 421 and the output end of the driving element 41. Furthermore, the second hinged seat and the second pull rod 4215 can be detachably connected, so that the fixing element 42 can be used independently in other working conditions.

Figure 5:
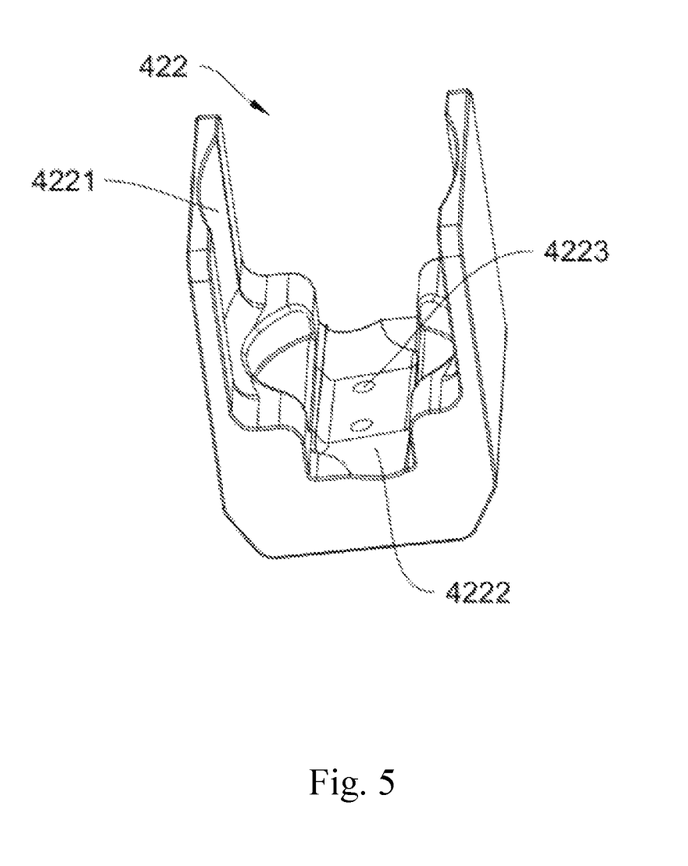
FIG. 5 is a schematic diagram of the structure of the limiting member provided by the specific embodiment of the invention.

Optionally, the inner wall of the limiting slot 4221 is matched with the outer wall of the first part set in the limiting slot 4221 to improve the limiting effect of the limiting member 422 on the first part in the second direction and to avoid the first part shaking in the limiting slot 4221 and colliding with the slot wall of the limiting slot 4221.

Further optionally, the limiting members 422 are provided in a plurality, and the plurality of the limiting members 422 are spaced along the first direction to further enhance the limiting effect of the limit members 422 on the first part in the second direction. The plurality of the limiting members 422 spaced along the same line is a group of limiting member 422, and a group of limiting member 422 limits the first part, so that the number of groups of limiting member 422 provided in the fixing element 42 depends on the number of first parts in the piece to be transported.

Further optionally, the limiting member 422 is detachably connected to the support frame 421, which can realize the change of the position of the limiting member 422 on a support member on one hand; on the other hand, the limiting member 422 of different models can be replaced to make the fixing element 42 can fix different shapes of the pieces to be transported to improve the applicability of the fixing element 42.

Referring to FIG. 5, specifically, the slot bottom of the limiting slot 4221 is provided with fastening hole 4223, a second fastener can be inserted into the support frame 421 through the fastening hole 4223 to achieve a removable connection of the limit member 422 to the support frame 421. Further, the second fastener can be a bolt structure, or can be a screw, pin, screw and other parts with fastening effect, without too much restriction herein.

Further, a part of the slot bottom of the limiting slot 4221 is recessed in the direction away from the limiting slot 4221 to form an avoidance slot 4222, the end of the second fastener near the piece to be transported is provided in the avoidance slot 4222, so that the end of the second fastener near the piece to be transported sinks to avoid the second fastener hitting the piece to be transported and causing damage to the piece to be transported during transportation.

Further optionally, the fastening bands 423 are provided in a plurality, and the plurality of fastening band 423 are spaced along the first direction to enhance the limiting effect of the fastening bands 423 on the first part in the third direction. The plurality of fastening bands 423 spaced along the same line is a group of fastening band 423, and a group of fastening strap 423 restricts the first part, so that the number of group of fastening bands 423 provided in the fixing element 42 depends on the number of first parts in the piece to be transported.

Further optionally, the position of the fastening band 423 on the support frame 421 is adjustable to allow the fastening band 423 to change its position according to the shape and length of the first part, thereby further improving the effect of the fastening band 423 in limiting the first part in the third direction.

Further, the connection sleeve 424 includes a first connection sleeve 4241 and a second connection sleeve 4242, one end of the first connection sleeve 4241 is rotatably connected to one end of the second connection sleeve 4242, the space between the first connection sleeve 4241 and the second connection sleeve 4242 is a holding cavity. A connecting sleeve 424 limits a second part, so the number of connecting sleeves 424 in the fixing element 42 depends on the number of the second parts in the piece to be transported.

Specifically, the rotating end of the first connection sleeve 4241 is provided with a bulge, the rotating end of the second connection sleeve 4242 is provided with a groove, the bulge can be inserted in the groove, the bulge is provided with a first rotating hole along the extension direction of the rotating axis of the first connection sleeve 4241, the groove wall on the opposite sides of the groove are provided with a second rotating hole along the extension direction of the rotating axis of the second connection sleeve 4242, the rotating part passes through the first rotating hole and the second rotating hole in turn to realize the rotational connection of the first connection sleeve 4241 and the second connection sleeve 4242.

Further optionally, the other end of the first connection sleeve 4241 is provided with a first connection hole, and the other end of the second connection sleeve 4242 is provided with a second connection hole, and the third fastener passes through the first connection hole and the second connection hole in turn to realize the removable connection of the first connection sleeve 4241 and the second connection sleeve 4242. Further, the third fastener may be a bolt structure, or may be screws, pins, screws and other parts with fastening effect, without making too much restriction here.

When using the connection sleeve 424 to limit the second part, the third fastener is first unconnected to the first connection sleeve 4241 and the second connection sleeve 4242, so that the first connection sleeve 4241 and the second connection sleeve 4242 are respectively rotated in the direction away from each other to leave sufficient space to place the second part; after the second part is placed, after the second part is placed, then make the first connection sleeve 4241 and the second connection sleeve 4242 rotate in the direction close to each other until the free end of the first connection sleeve 4241 is abutted against the free end of the second connection sleeve 4242; finally using the third fastener to connect the free end of the first connection sleeve 4241 with the free end of the second connection sleeve 4242.

Further optionally, the second connection sleeve 4242 is convexly provided with an arched projection on the side away from the first connection sleeve 4241, and the arched projection is provided with a third hinge hole, and the support frame 421 is provided with a third hinged seat, the third hinged seat includes a third pivot shaft, and the third pivot shaft can penetrate the third hinge hole to achieve a rotational connection between the connection sleeve 424 and the support frame 421, so that the relative position between the connection sleeve 424 and the support frame 421 can be adjusted according to the relative position of the second part and the main body to improve the applicability of the fixing element 42.

Further optionally, the connection sleeve 424 is removably connected to the support frame 421, facilitating the replacement of different models of the connection sleeve 424.

In this embodiment, the material of the connecting sleeve 424 is glass fiber material, so that the connecting sleeve 424 can absorb the impact energy of the piece to be transported to the fixing element 42 during the fixing process to ensure that the piece to be transported is not damaged during the fixing process.

Further, the inner side of the connection sleeve 424 is provided with a cushion, and the cushion has a certain elasticity, so that the cushion can not only cushion the impact of the piece to be transported on the fixing element 42, but also can fit more closely with the piece to be transported inside the connection sleeve 424, so as to effectively protect the piece to be transported.

This embodiment also provides a UAV, which is transported by the transport vehicle above. The UAV is connected to the overturning assembly 4, and the overturning assembly 4 is used for driving the UAV to rotate until the UAV is set at the first predetermined position or the second predetermined position, thus realizing fast loading and fast unloading of the UAV on the transport vehicle, which saves the labor cost of the UAV in the loading and unloading process and also improves the transportation efficiency of the UAV.

Further, the UAV includes a main body, a wing, and a vertical tails. Wherein, the main body extends along the first direction. The vertical tail is provided with two, and the two vertical tails are provided on both sides of the main body along the second direction. The wing connects to the vertical tail and the main body, so that the number of wings depends on the number of vertical tails. The fixing element 42 in the overturning assembly 4 is used for limiting the displacement of the vertical tail in the second direction as well as in the third direction; the fixing element 42 is also used for limiting the displacement of the wings in the first direction, so as to achieve the fixation of the UAV on the overturning assembly 4. The driving element 41 in the overturning assembly 4 can drive the fixing element 42 to rotate relative to the base plate 31 of the container 3 to achieve the rotation of the UAV relative to the base plate 31, thereby facilitating the fast loading and fast unloading of the UAV on the transport vehicle.

Those skilled in the art will understand that the invention is not limited to the specific embodiments described here. For those skilled in the art, various obvious changes, readjustments and replacements can be made without departing from the protection scope of the invention. Therefore, although the invention is described in more detail through the above embodiments, the invention is not limited to the above embodiments, but can also include more equivalent embodiments without departing from the concept of the invention, and the scope of the invention is determined by the scope of the appended claims.

What is claimed is:

1. A transport vehicle, characterized in that, it comprises:
    a head (1), which is provided with a cockpit inside, the cockpit is provided with a control assembly, the control assembly is used for controlling a movement state of the transport vehicle;
    a carrying plate (2) connected to a front end (1);
    a container (3) provided on the carrying plate (2);
    the container (3) comprises at least a base plate (31) and an opening (32);
    the base plate (31) is provided with an overturning assembly (4), the overturning assembly (4) is rotatably connected to the base plate (31), wherein the overturning assembly (4) is used for driving a piece to be transported to rotate from a first predetermined position around a side direction of the base plate (31) until the piece to be transported is arranged at a second predetermined position through the opening (32);
    wherein the fixing element (42) is rotatably connected to the base plate (31);
    wherein the overturning assembly (4) comprises:
        a fixing element (42) for fixing the piece to be transported; and
        a driving element (41), one end of the driving element (41) is rotatably provided on the base plate (31), an output end of the driving element (41) is rotatably connected to the fixing element (42), the output end of the driving element (41) is capable of telescoping to drive the fixing element (42) to rotate around a connection of the fixing element (42) with the base plate (31);
    wherein the fixing element (42) comprises:
        a support frame (421) for carrying the piece to be transported;
            wherein the piece to be transported includes a main body, a first part and a second part, wherein the first part is provided along a first direction, the second part connects the main body and the second part;
        wherein at least two members of a group consisting of the first direction, a second direction and a third direction are perpendicular to each other;
        a limiting member (422) provided on a side of the support frame (421) near the piece to be transported, wherein a limiting slot (4221) is arranged on the limiting member (422), and wherein the first part is provided in the limiting slot (4221);
        a fastening band (423) in the form of a loop, wherein a first end of the fastening band (423) is sleeved with the support frame (421), a second end of the fastening band (423) is sleeved with the first part, wherein the fastening band (423) has a tendency to move the first part and the support frame (421) in close proximity to each other;
        a connection sleeve (424) provided along the third direction on the side of the support frame (421) near the piece to be transported, wherein the connection sleeve (424) is provided with a holding cavity inside, and wherein the second part is capable of passing through the holding cavity along the second direction.

2. The transport vehicle according to claim 1, characterized in that it further comprises a connecting rod (43), a first end of the connecting rod (43) is connected to the fixing element (42) and a second end is pivotally connected to the base plate (31).

3. The transport vehicle according to claim 2, wherein there are at least two of said connecting rod (43), the at least two connecting rods (43) are spaced along an extension direction of the carrying plate (2).

4. The transport vehicle according to claim 2, characterized in that the connecting rod (43) is provided with a plurality of first weight reduction slots (431) along an extension direction of the connecting rod.

5. The transport vehicle according to claim 1, characterized in that the limiting member (422) is removably connected to the support frame (421).

6. The transport vehicle according to claim 1, characterized in that there are at least two of said limiting members (422), wherein said at least two of the limiting members (422) are spaced along the first direction.

7. The transport vehicle according to claim 1, characterized in that the fastening band (423) is adjustable in position on the support frame (421).

8. An unmanned aerial vehicle (UAV), transported by a transport vehicle, characterized in that the UAV is connected to a overturning assembly (4), which is used for driving the UAV to rotate until the UAV is set at a first predetermined position or a second predetermined position;
    wherein the transport vehicle is comprised of
        a head (1), which is provided with a cockpit inside, the cockpit is provided with a control assembly, the control assembly is used for controlling a movement state of the transport vehicle;
        a carrying plate (2) connected to a front end (1);
        a container (3) provided on the carrying plate (2);
        wherein the container (3) comprises at least a base plate (31) and an opening (32); and
        wherein the base plate (31) is provided with the overturning assembly (4), the overturning assembly (4) is rotatably connected to the base plate (31), wherein the overturning assembly (4) is used for driving a piece to be transported to rotate from the first predetermined position around a side direction of the base plate (31) until the piece to be transported is arranged at the second predetermined position through the opening (32).

9. The unmanned aerial vehicle as recited in claim 8, wherein the overturning assembly (4) comprises:
   a fixing element (42) for fixing the piece to be transported; and
   wherein the fixing element (42) is rotatably connected to the base plate (31);
   a driving element (41), one end of the driving element (41) is rotatably provided on the base plate (31), an output end of the driving element (41) is rotatably connected to the fixing element (42), the output end of the driving element (41) is capable of telescoping to drive the fixing element (42) to rotate around a connection of the fixing element (42) with the base plate (31).

10. The unmanned aerial vehicle as recited in claim 9, further comprising a connecting rod (43); wherein a first end of the connecting rod (43) is connected to the fixing element (42) and a second end is pivotally connected to the base plate (31).

11. The unmanned aerial vehicle as recited in claim 10, wherein there are at least two of said connecting rod (43), the at least two connecting rods (43) are spaced along an extension direction of the carrying plate (2).

12. The unmanned aerial vehicle as recited in claim 10, wherein the connecting rod (43) is provided with a plurality of first weight reduction slots (431) along an extension direction of the connecting rod.

13. The unmanned aerial vehicle as recited in claim 9, wherein the fixing element (42) comprises:
   a support frame (421) for carrying the piece to be transported;
   wherein the piece to be transported includes a main body, a first part and a second part, wherein the first part is provided along a first direction, the second part connects the main body and the second part;
   wherein at least two members of a group consisting of the first direction, a second direction and a third direction are perpendicular to each other;
   a limiting member (422) provided on a side of the support frame (421) near the piece to be transported, wherein a limiting slot (4221) is arranged on the limiting member (422), and wherein the first part is provided in the limiting slot (4221);
   a fastening band (423) in the form of a loop, wherein a first end of the fastening band (423) is sleeved with the support frame (421), a second end of the fastening band (423) is sleeved with the first part, wherein the fastening band (423) has a tendency to move the first part and the support frame (421) in close proximity to each other; and
   an connection sleeve (424) provided along the third direction on the side of the support frame (421) near the piece to be transported, wherein the connection sleeve (424) is provided with a holding cavity inside, and wherein the second part is capable of passing through the holding cavity along the second direction.

14. The unmanned aerial vehicle as recited in claim 13, wherein the limiting member (422) is removably connected to the support frame (421).

15. The unmanned aerial vehicle as recited in claim 13, wherein there are at least two of said limiting members (422), wherein said at least two of the limiting members are spaced along the first direction.

16. The unmanned aerial vehicle as recited in claim 13, wherein the fastening band (423) is adjustable in position on the support frame (421).

* * * * *